(12) United States Patent
Meneghini et al.

(10) Patent No.: US 7,107,834 B2
(45) Date of Patent: Sep. 19, 2006

(54) THERMAL MASS FLOW RATE SENSOR INCLUDING BYPASS PASSAGEWAYS AND A SENSOR PASSAGEWAY HAVING SIMILAR ENTRANCE EFFECTS

(75) Inventors: Paul Meneghini, Haverhill, MA (US); Ali Shajii, Canton, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/988,026

(22) Filed: Nov. 12, 2004

(65) Prior Publication Data

US 2006/0101908 A1    May 18, 2006

(51) Int. Cl.
*G01F 1/68* (2006.01)

(52) U.S. Cl. .................. 73/204.21; 73/202.5

(58) Field of Classification Search ............... None
See application file for complete search history.

(56) References Cited

U.S. PATENT DOCUMENTS

| | | | | |
|---|---|---|---|---|
| 3,938,384 A | * | 2/1976 | Blair | 73/204.22 |
| 4,487,062 A | * | 12/1984 | Olin et al. | 73/202.5 |
| 4,522,058 A | | 6/1985 | Ewing | |
| 4,571,801 A | | 2/1986 | Ewing | |
| 4,961,344 A | * | 10/1990 | Rodder | 73/202 |
| 5,090,241 A | * | 2/1992 | Kobayashi | 73/204.26 |
| 5,295,394 A | | 3/1994 | Suzuki | |
| 5,332,005 A | | 7/1994 | Baan | |
| 5,750,892 A | * | 5/1998 | Huang et al. | 73/202 |
| 5,763,774 A | * | 6/1998 | Ha et al. | 73/202 |
| 5,824,894 A | | 10/1998 | Lucas et al. | |
| 6,119,730 A | | 9/2000 | McMillan | |
| 6,247,495 B1 | * | 6/2001 | Yamamoto et al. | 73/202 |
| 6,422,256 B1 | | 7/2002 | Balazy et al. | |

* cited by examiner

*Primary Examiner*—Harshad Patel
(74) *Attorney, Agent, or Firm*—McDermott Will & Emery LLP

(57) ABSTRACT

A sensing apparatus for use in a mass flow rate sensor for measuring a fluid flow rate includes a main conduit for containing a fluid flow, and a sensor passageway for tapping a portion of the fluid flow from the main conduit at a first location, and returning the portion of the fluid flow to the conduit at a second location. At least one bypass passageway, which may be provided in the form of a tube, is positioned in the main conduit between the first and second locations, and the bypass passageway is provided with non-negligible entrance effects that are substantially equal to entrance effects of the sensor passageway, so that a bypass ratio of the apparatus remains constant. A mass flow rate sensor of the present disclosure accurately measures any type of gas but only requires calibration in only one reference gas.

23 Claims, 3 Drawing Sheets

(PRIOR ART)

THERMAL MASS FLOW RATE SENSOR INCLUDING BYPASS PASSAGEWAYS AND A SENSOR PASSAGEWAY HAVING SIMILAR ENTRANCE EFFECTS

FIELD OF THE DISCLOSURE

The present disclosure relates to mass flow rate sensors, and more particularly, to a thermal based mass flow rate sensor having a sensor passageway and at least one bypass passageway, wherein the bypass passageway has non-negligible entrance effects similar to entrance effects of the sensor passageway so that the mass flow rate sensor accurately measures any type of gas but only requires calibration in one reference gas.

BACKGROUND OF THE DISCLOSURE

In the semiconductor manufacturing industry, it is necessary to achieve precise control of the quantity, temperature and pressure of one or more reactant materials which are delivered in a gaseous state to a reaction chamber. Mass flow controllers are widely used in the semiconductor manufacturing industry to control the delivery of process reactants. A mass flow controller generally includes a mass flow rate sensor for measuring the rate of flow of gas through the controller, a valve for controlling the flow of gas through the controller and a computer connected to the mass flow rate sensor and the valve. The computer- is programmed with a desired flow rate, which the computer compares to an actual flow rate as measured by the mass flow rate sensor. If the actual flow rate does not equal the desired flow rate, the computer is further programmed to open or close the valve until the actual flow rate equals the desired flow rate.

Thermal mass flow sensors operate on the principle of conservation of thermal energy, where power applied to a flowing gas equals the mass flow rate of the gas multiplied by the specific heat of the gas, the density of the gas and the temperature change of the gas. The mass flow rate can therefore be determined if the properties of the gas, the temperature changes of the gas, and the rate of power applied to the gas are known.

One class of thermal mass flow rate sensors employs a sensor passageway as the primary sensing mechanism, as shown in the exemplary prior art mass flow rate sensor 10 of FIG. 1. In such a device, a sensor passageway 12 diverts a portion 14 of the main flow 16 passing through a primary conduit 18 of the MFC, while the remainder of the flow passes through the primary conduit and a bypass tube 18a. It is important to note that this figure is not necessarily to scale. Typically the sensor passageway 12 is significantly smaller than the primary conduit 18, but the sensor passageway 12 is shown with somewhat exaggerated largeness in FIG. 1 for clarity. Generally one or more heating elements 20 attach to the sensor passageway 12 to allow a heat transfer from the heating elements 20, through the tube 12 and to the fluid. The heating elements 20 also serve as resistance temperature sensors that track the local temperature of the wall of the sensor passageway 12.

Heat transfer between the fluid flowing in the sensor passageway 12 from the tube walls is a function of the difference between the fluid temperature and the wall temperature, and the heat transfer rate coefficient inside of the tube 12. The increase in gas temperature between the two heating elements 20 is a function of the mass flow rate of the gas through the sensor passageway 12, the specific heat of the gas, and the power delivered to the heater elements 20. A circuit converts the difference in resistance (or temperature) of the two elements 20 into a voltage output (power) which is calibrated to known flow rates. Normally, the change in resistance is converted to voltage by a Wheatstone bridge, which is connected to the processor. The processor compares the voltage level to stored reference gas calibration data to determine the flow rate. The stored reference gas calibration data, or table, includes voltages produced by the sensor for a range of known flow rates of the reference gas.

Since the calibration data changes for gases other than the reference gas, a characterization of the calibration data is required for each type of gas being measured in the sensor passageway 12, in order for the resulting measurement to be accurate. This characterization is also referred to as multi-gas correction functions. The multi-gas correction function is the ratio of flows, in the sensor passageway 12 only, of the new gas over the reference gas (Qnew/Qref). This ratio changes with sensor voltage. The calibration table of the reference gas is simply a list of sensor voltages and measured total flows at those voltages. To obtain the calibration table in the new gas, the flow of the reference gas is multiplied by the multi-gas correction function at each voltage in the reference gas calibration table. The multi-gas correction function is meant to make the sensor passageway 12 independent of the type of gas being measured.

The multi-gas correction function assumes that a bypass ratio is the same in both the reference gas and the gas being measured. The bypass ratio η (also referred to as split ratio) of the sensor 10 is defined as the total flow through the bypass tube 18a and the sensor passageway 12, $Q_{total}$ divided by flow through just the sensor passageway 12, $Q_{sensor}$.

$$BypassRatio \equiv \eta = \frac{Q_{Total}}{Q_{sensor}} \quad (1)$$

In a multi-gas application, η must be equal for all gases. Any change in 72 from that of the reference gas is defined as the multi-gas bypass ratio error $\epsilon_{bp}$ for that gas.

$$MulitgasBypassRatioError \equiv \varepsilon_{bp} = \left(\frac{\eta - \eta_{ref}}{\eta_{ref}}\right) \quad (2)$$

$\epsilon_{bp}$ translates directly into a calibration error for the new gas. The bypass tube 18a is normally designed to minimize this error.

The multi-gas bypass ratio error $\epsilon_{bp}$ occurs because the bypass ratio η changes for different gases because of pressure losses, such as entrance effects, caused by non-ideal geometric conditions of the primary conduit, the bypass tube and the sensor passageway. Entrance effects generally can be defined as the pressure drop associated with the flow entering the duct divided by the total pressure drop across the duct. These pressure losses are often referred to as "Reynolds losses" because the losses are a function of the Reynolds number of the gas being measured. The Reynolds losses can be a major source of error in measuring the gas flow. The Reynolds losses are normally minimized or eliminated so that the bypass ratio η remains constant for different gases by properly designing the bypass passageway 18a. Properly designing the bypass passageway 18a, however, often results in a complex, relatively large and expensive sensor 10. For example, most bypass tubes are provided with laminar flow elements comprising one or more long, thin channels which make the entrance effects of each channel negligible.

It is an object of the present disclosure to provide an improved thermal mass flow rate sensor which can be used with different gases. Preferably, the improved thermal mass flow rate sensor will accurately measure any type of gas but will only require calibration in only one reference gas, such that a characterization of the bypass ratio is not required for each type of gas being measured.

SUMMARY OF THE DISCLOSURE

The present disclosure provides a new and improved mass flow rate sensor for measuring a fluid flow rate. The apparatus includes a main conduit for containing a fluid flow, and a sensor passageway for tapping a portion of the fluid flow from the main conduit at a first location, and returning the portion of the fluid flow to the conduit at a second location. At least one bypass passageway is positioned in the main conduit between the first and second locations, and the bypass passageway is provided with entrance effects that are substantially equal to entrance effects of the sensor passageway. According to one aspect of the present disclosure, the mass flow rate sensor includes a plurality of bypass passageways and each bypass passageway has entrance effects that are substantially equal to the entrance effects of the sensor passageway.

Among other features and benefits, the mass flow rate sensor of the present disclosure accurately measures any type of gas but only requires calibration in only one reference gas, such that a characterization of a bypass ratio is not required for each type of gas being measured.

BRIEF DESCRIPTION OF THE DRAWINGS

The foregoing and other objects of this disclosure, the various features thereof, as well as the disclosure itself, may be more fully understood from the following description, when read together with the accompanying drawings in which.

Elements having the same reference character designations represent like elements throughout the drawings.

DETAILED DESCRIPTION OF EXEMPLARY EMBODIMENTS

Figure 1:
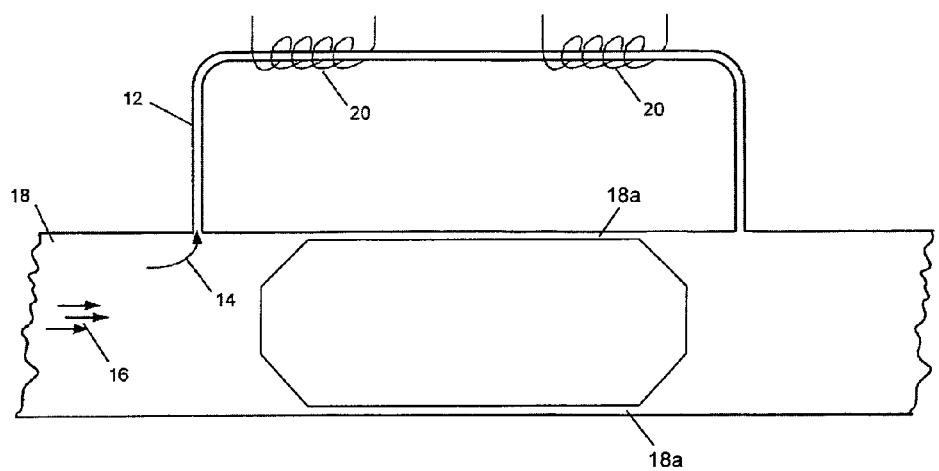
FIG. 1 shows an exemplary embodiment of a mass flow rate sensor constructed in accordance with the prior art.
Figure 2:
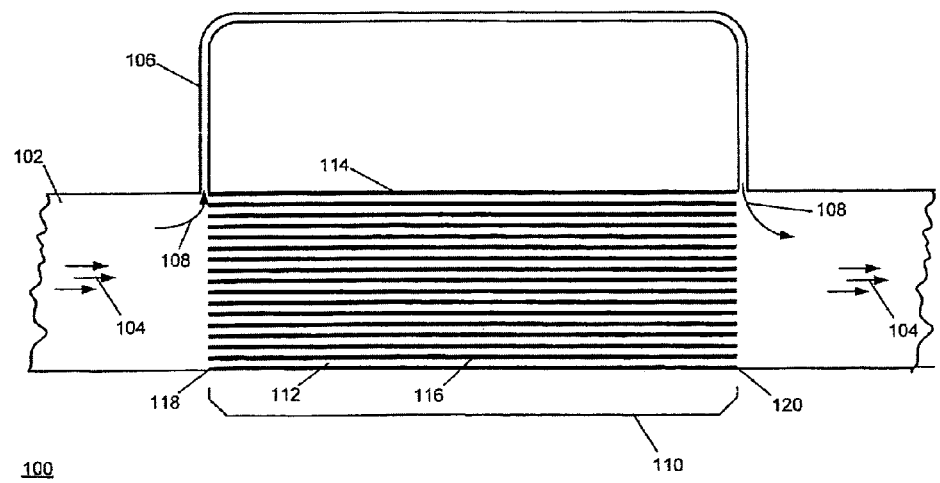
FIG. 2 shows a sectional view of an exemplary embodiment of a mass flow rate sensor constructed in accordance with the present disclosure and including a main conduit and a sensor passageway for tapping a portion of the fluid flow from the main conduit, and multiple bypass passageways positioned in the main conduit.

Referring to the drawings, FIG. 2 shows a sectional view of an exemplary embodiment of a sensor apparatus 100 for use in a mass flow rate sensor. The sensor apparatus 100 includes a main conduit 102 for containing a fluid flow 104, and a sensor passageway 106 (also referred to as a capillary tube) for tapping a portion 108 of the fluid flow 104 from the main conduit 102 at a first location, and returning the portion 108 of the fluid flow to the conduit 102 at a second location, around a bypass section 110 of the main conduit 102. The bypass section 110 includes at least one bypass passageway 112.

The bypass passageway 112 is provided with a hydrodynamic development length that is substantially equal to a hydrodynamic development length of the sensor passageway 106 so that the entrance effects are similar for both the sensor passageway 106 and the bypass passageway 110. Similar entrance effects occur when viscous losses due to flow entering each tube 106, 110 are equal even if the tubes have different geometries. Among other features and benefits, a mass flow rate sensor 100 of the present disclosure accurately measures any type of gas but only requires calibration in one reference gas, such that a characterization of a bypass ratio is not required for each type of gas being measured. In other words, the new and improved thermal mass flow rate sensor 100 is substantially independent of gas properties.

The sensor passageway 106 and the bypass passageway 112 in the exemplary embodiment of FIG. 2 are characterized by a round cross section, i.e., having an inner radius and an outer radius, and the bypass passageway 112 actually comprises a tube. Other cross sections may also be used, as long as the entrance effects of the bypass passageway 112 are the same as or approximate the entrance effects of the sensor passageway 106. For example, the bypass passageways may have a square cross section, which may be formed between layers of a laminar flow element. The bypass passageways may also be formed within a rolled sheet, wherein the passageways comprise the spaces between each layer of the rolled sheet.

Figure 3:
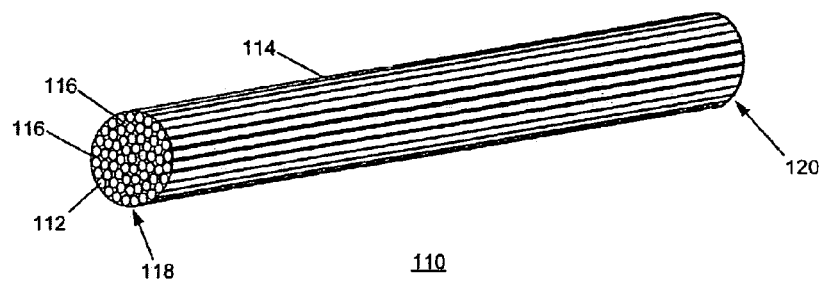
FIG. 3 shows a perspective view of the bypass passageways of the mass flow rate sensor of FIG. 2.
Figure 4:
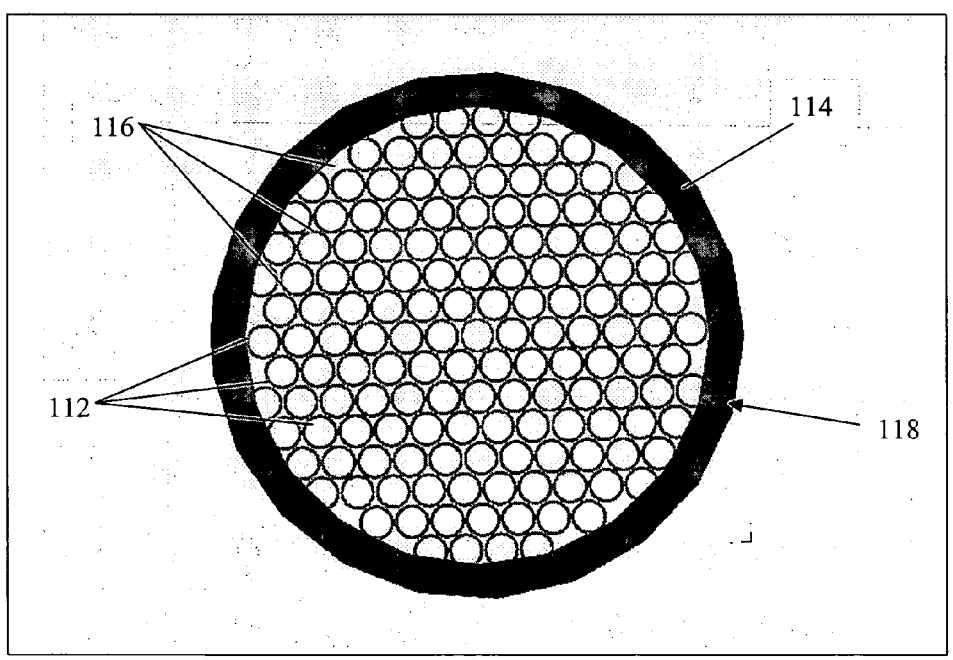
FIG. 4 shows an elevation end view of the bypass passageways of the mass flow rate sensor of FIG. 2.

In the exemplary embodiment of FIG. 2 the bypass section 110 includes a number of the bypass tubes 112, disposed parallel to one another and surrounded by a housing tube 114. FIGS. 3 and 4 also show the bypass tubes 112 and the housing tube 114. The housing tube 114 is shown transparent in FIG. 3 so that the individual bypass tubes 112 may be observed. Referring to FIG. 3, the bypass tubes 112 and the housing tube 114 extend between a first end 118 and a second end 120, and spaces 116 are located between the individual bypass tubes 112. Each bypass tube 112 is provided with a hydrodynamic development length that is substantially equal to a hydrodynamic development length of the sensor passageway 106 so that the entrance effects are similar for both the sensor passageway 106 and the bypass tube 110.

In other exemplary embodiments, the multiple bypass tubes 112 are not associated with a housing, but are simply pressed together into a bypass plug and disposed within the main conduit 102 between the two ends of the capillary tube 106. In one embodiment, the housing tube 114 is constructed and arranged so as to compress the bypass tubes 112 against one another. The housing tube 114 preferably compresses the bypass tubes together without substantially deforming the bypass tubes 112, although in other embodiments, some measure of deformation to the bypass tubes 112 may be permitted, but only if the entrance effects of the bypass tubes remains substantially equivalent to the entrance effects of the sensor passageway.

In one embodiment, the spaces 116 between the individual bypass tubes 112, and also between the bypass tubes and the housing tube, are blocked so that the remaining fluid 104 (i.e., the fluid not passing through the capillary tube 106) only passes through the bypass tubes 112. In some embodiments, the spaces 1 16 are blocked only at the first end 118 and the second end 120 of the bypass section 110, although other embodiments may include blocking material in the spaces 116 along the entire length of the bypass passageways 112.

A bypass ratio of the bypass apparatus 100 is given by the ratio of the amount of fluid flowing through the bypass section 110 to the amount of fluid flowing through the sensor passageway 106. The number of bypass tubes 112 in the bypass section 110 may be chosen to result in a desired bypass ratio. For example, an embodiment with ninety-nine bypass tubes 112 and one sensor passageway 106, wherein the bypass tubes and the sensor passageway have the same dimensions, would provide a bypass ratio of 100.

The bypass ratio is defined as total flow $Q_{total}$ through the sensor passageway and the bypass tube divided by flow $Q_{sensor}$ through just the sensor passageway.

$$BypassRatio \equiv \eta = \frac{Q_{total}}{Q_{sensor}} \qquad (3)$$

In a multi-gas application, $\eta$ must be equal for all gases. Any change in $\eta$ from that of the reference gas is defined as the multi-gas bypass ratio error for that gas.

$$MulitgasBypassRatioError \equiv \varepsilon_{bp} = \frac{\eta - \eta_{ref}}{\eta_{ref}} \qquad (4)$$

$\varepsilon_{bp}$ translates directly into a calibration error for the new gas. The bypass tubes must be designed to minimize this error.

The hydrodynamic characteristics of each of the bypass tubes 112 must match (or closely approximate) those of the sensor passageway 106 for the embodiments described herein. The physical characteristics (e.g., size) of the bypass tubes 112, however, may be different as compared to the sensor passageway 106. For exemplary bypass tubes having a substantially round cross section, the hydrodynamic characteristics will remain substantially equal for a change in the bypass tube inside diameter as long as the bypass tube length correspondingly changes as the inside diameter raised to a power of four. For example, if the bypass tubes have an inside diameter that is one half of the inside diameter of the capillary tube, the length of the bypass tube must be $\frac{1}{16}$ as long as the capillary tube, in order to maintain hydrodynamic equivalence.

In one embodiment, one or more of the bypass tubes 112 may be replaced with a solid rod, so as to reduce the total number of paths in the bypass section 110, thereby modifying the bypass ratio. In some embodiments, the bypass tubes 112 are uniformly distributed, or distributed in a regular pattern, over the cross sectional area of the main conduit 102.

For simple geometries, the Navier-Stokes equation for incompressible laminar flow in a duct can be solved in closed form creating an elementary model of the bypass element. For the bypass tubes 112 and the sensor passageway 106 the solution for flow in a pipe $Q_{pipe}$ equals, $$Q_{pipe} = \frac{\pi}{8\mu} * \left(\frac{-dp}{dx}\right) r_o^4 \qquad (5)$$

Where $\mu$ is the viscosity of the gas, and $r_o$ is the radius of the pipe. If the cross section is constant, the pressure term is linear.

$$\left(\frac{dp}{dx}\right) = \frac{\Delta p}{L} \qquad (6)$$

Where L is the length of the pipe and $\Delta p$ is the change of pressure of the gas over the length L.

An expression for the bypass ratio is obtained by combining the equations above. Constants like $\pi$ and $\mu$ drop out and $\Delta p$ drops out because the pressure drop across the bypass is the same as the pressure drop across the sensor passageway. The resulting equation shows that the bypass ratio is proportional to the radial dimension to the $4^{th}$ power but it is only linearly proportional to the length. For the bundled tube bypass, the variable N is introduced as the number of tubes in the bypass.

$$\eta_{Tubes} = \frac{N_{Tubes} L_s r_{Tubes}^4}{L_{bp} r_s^4} \qquad (7)$$

Where $L_{bp}$ is the Length of the bypass tube, $L_s$ is the Length of the sensor passageway, $r_s$ is the radius of the sensor passageway, N is the number of bypass tubes, and $r_{tubes}$ is the combined radii of the bypass tubes. As shown, the bypass ratio is only a function of geometry and is therefore the same in all gases. This is true as long as the assumptions that go into the elementary model are valid.

The only significant assumption in the elementary model is that the flow is fully developed. The term "fully developed" means that a cross sectional velocity distribution of the flow in the pipe is the same at every point in the length of the pipe. This assumption does not hold in the entrance to the pipe, where the hydrodynamic development length or entrance length, is the distance the flow must travel down the tube before flow becomes fully developed.

In the hydrodynamic development length, a viscous fluid enters a duct, the uniform velocity distribution of the flow is gradually redistributed into a parabolic velocity profile due to the retarding influence of the shear stresses along the side walls. At an end of the hydrodynamic development length, the velocity profile no longer changes in the axial direction, and under such conditions the flow is said to be fully-developed.

Dimensional analysis and empirical studies have shown that the hydrodynamic development length is a function of the Reynolds number, Re, and the hydraulic diameter, Dh, of the duct.

$$EntranceLength = Le \approx 0.06 \text{ Re Dh} \qquad (8)$$

The entrance length has an associated pressure drop that is known as the entrance effect. An exact solution for the entrance effect is not known, however a dimensionless ratio of the entrance length to the duct length can be used as a first order approximation of the entrance effect.

$$L_{eff} \approx Le/L \qquad (9)$$

$L_{eff}$ is an approximation of the error in the dp/dx term or the error in the assumption of equation 4. Since the entrance length $L_e$ is a function of Re, the entrance length $L_e$ is in turn a function of both gas and flow and thus it becomes a source for multi-gas bypass ratio error ($\varepsilon_{bp}$). The best way to eliminate this source of error is to design the sensor passageway 106 and the bypass tubes 112 such that the entrance effect is small. If it is not possible to design the sensor passageway 106 and the bypass tubes 112 such that the entrance effect is small, each of the bypass tubes 112 and the sensor passageway 106 are designed such that the entrance effect is the same in both.

A bundled tube bypass is a laminar flow element that is comprised of a matrix of many of the small bypass tubes 112 packed into a housing tube 114 as shown in FIGS. 2 through 4. The advantage of the bundled bypass tubes over a single bypass tube is that the bundled bypass tubes utilize much more of the available cross sectional area of the conduit 102 (as shown in FIG. 2) while still behaving like a small tube, i.e., similar to the sensor passageway 106. The bundled bypass tubes allow bypasses for much higher flow rates to be designed while keeping the bypass ratio constant in all gases.

According to one exemplary embodiment, the bundled bypass tubes 112 are a matrix of tubes 112 that are geometrically identical (i.e., same length and inside diameter) to the sensor passageway 106 and packed in tight triangular fashion as shown in FIG. 4. The packing density of the matrix of tubes 112 is uniform, since any inconsistencies in the packing density will create flow passages with different diameters and different entrance effects. Since the flow is proportional to the $4^{th}$ power of the diameter, it is only the imperfections that create larger gaps in the matrix that cause a problem and the smaller passages can be neglected. For example, if the tubes 112 are packed together as shown in FIG. 4, the hydraulic diameter of the spaces 116 between the tubes is about $\frac{1}{10}^{th}$ of the outside diameter of the bypass tubes and the flow through the spaces 116 is $\frac{1}{100}^{th}$ of 1% of the total flow. The performance of the bundled bypass tubes 112 is a summation of all the flow passages. Therefore, the more tubes 112 in the bundled bypass tubes, the more the imperfections will average out. Bypasses with many tubes 112 are more consistent in $\eta$ and in $\epsilon_{bp}$.

The number of bypass tubes 112 in the housing 114 can be approximated from the inside diameter of the bypass housing 114 and the outside diameter of each of the bypass tubes. The number of tubes 112 can further be adjusted by replacing some of the tubes 112 with solid filled rods.

$$N_{tubes} \approx 0.907 \left( \frac{ID_{house}}{OD_{tubes}} - 1 \right)^2 - N_{rods} \qquad (10)$$

Unfortunately, it is rarely possible to use the same tube size in the bypass as in the sensor so a bypass tube 112 is designed where the entrance effect is similar to that in the sensor passageway. By setting $L_{eff}$ of the sensor passageway 106 equal to $L_{eff}$ of the bypass tube 112, an expression for the bypass tube 112 radius that satisfies this condition can be derived.

$$r_{tubes} = \sqrt[3]{\frac{L_{bp}}{L_s}} \, r_s \qquad (11)$$

Equation 9 is only a first order approximation. Since there is no closed form solution for the entrance effect, a numerical simulation is required to determine the geometry that achieves this condition.

Based on the elementary model and the assumptions that go into it, design guidelines for the bundled bypass tubes in multi-gas applications include: an entrance effect for the bypass tube 112 and the sensor passageway 106 should be equivalent and as small as possible; a packing density of the bundled bypass tubes 112 must be as uniform as possible, and preferably a triangular pattern such as shown in FIG. 4; the packing density pattern of the bundled bypass tubes 112 should not have gaps or holes that are larger than an inside diameter of the bypass tubes 112 since such gaps or holes will result in a multi-gas error; the bypass ratio will be proportional to the $4^{th}$ power of the diameter of the bypass tubes 112; the bypass ratio will be directly proportional to the number of bypass tubes 112; the bypass ratio will be directly proportional to the length of each of the bypass tubes 112; and the more bypass tubes 112 in the bundle, the more repeatable the bundled bypass tubes will be.

Since there is no exact solution for the entrance effect, a numerical model of flow in a passageway was developed to explore this effect. The sensor flow and the bypass flow are modeled independently. Axi-symetry is employed and the flow is considered to be incompressible. The boundary conditions for these models are $\Delta P$, or more specifically, the inlet pressure with the exit pressure set to zero. The flow is obtained by integrating the normal velocity across the exit and the bypass ratio is obtained by dividing the bypass flow by the sensor flow at the same pressure. The length, inside diameter and $\Delta P$ are parametrically defined. As the pressure goes up, the flow through the passageway increases.

Figure 5:
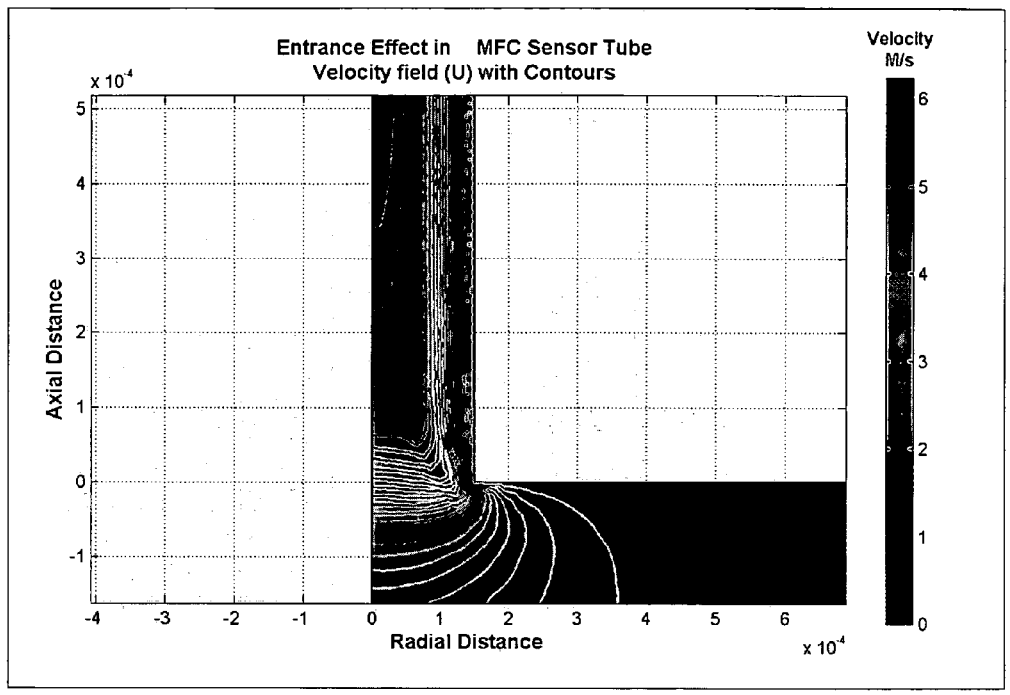
FIG. 5 is a graph illustrating entrance effects in a sensor passageway.

FIG. 5 shows a typical velocity field at the entrance of the sensor passageway. When the flow is fully developed, the velocity contours should all be parallel to the edge of the passageway. A bundled tube bypass with ideal packing can be simulated with the sensor passageway model by changing the ID and L of the passageway and dividing the flow by the sensor passageway flow at the same pressure. This would represent $\eta$ of one bundled tube ($N_{Tubes}=1$), but it could also represent $\eta$ of any number of tubes simply by multiplying it by $N_{Tubes}$. $\epsilon_{bp}$ would also be the same in one tube as it would be in many tubes. By running the model in other gases, $\epsilon_{bp}$ can be obtained.

Figure 6:
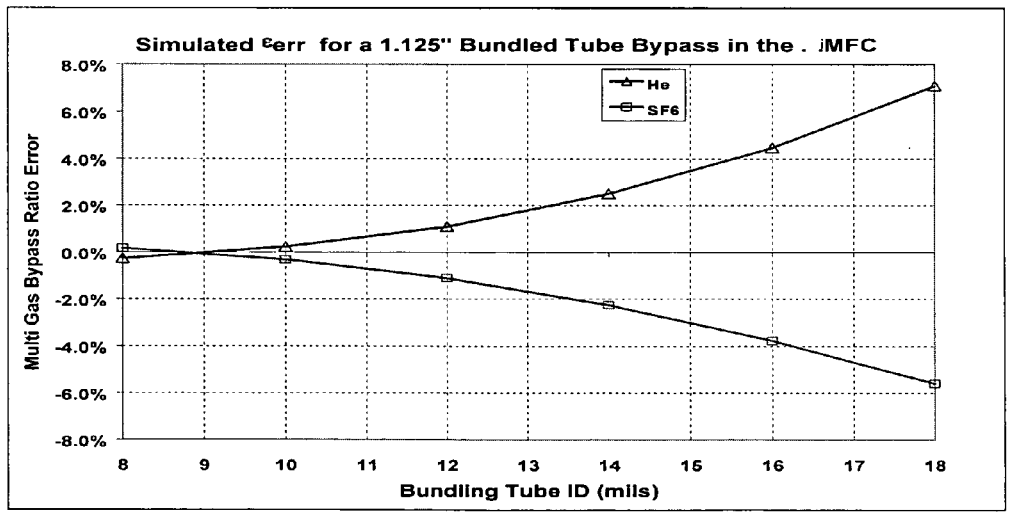
FIG. 6 is a graph illustrating multiple gas bypass ratio errors for two gases versus bypass passageway inside diameters for bypass passageways of a given length for a mass flow rate sensor constructed in accordance with the present disclosure.

FIG. 6 shows $\epsilon_{bp}$ as a function of the inside diameter of the bundling tube for the mass flow controller at %120 full range for both $SF_6$ and He. FIG. 6 shows that for a bypass tube that is 1.125" long in the mass flow controller, the inside diameter should be between 8 and 10 mils to have $\epsilon_{bp}$ be negligible. The fact that both $SF_6$ and He, which have very different Reynolds numbers, have zero error at exactly the same diameter proves that there is an equivalent length and diameter combination where the entrance effect is the same as in the sensor passageway. Equation 9 predicts a diameter of 9.7 mils which is high by %8. This error comes from the approximations in equation 6 and that $L_{eff}$ is equal to the error in equation 4.

Although not shown, a mass flow rate sensor including the sensor apparatus 100 of the present invention can be incorporated in a mass flow controller, for example. A mass flow controller generally includes the mass flow rate sensor for measuring the rate of flow of gas through the controller, a valve for controlling the flow of gas through the controller and a computer connected to the mass flow rate sensor and the valve. The computer is programmed with a desired flow rate, which the computer compares to an actual flow rate as measured by the mass flow rate sensor. If the actual flow rate does not equal the desired flow rate, the computer is further programmed to open or close the valve until the actual flow rate equals the desired flow rate.

The present disclosure may be embodied in other specific forms without departing from the spirit or essential characteristics thereof. The exemplary embodiments describe herein are therefore to be considered in respects as illustrative and not restrictive, the scope of the disclosure being indicated by the appended claims rather than by the foregoing description. All changes which come within the meaning and range of the equivalency of the claims are therefore intended to be embraced therein.

What is claimed is:

1. A mass flow rate sensor, having a predetermined bypass ratio, for measuring a mass flow rate of a gas, comprising:
a main conduit for containing a gas flow;
a sensor passageway configured to tap a portion of the gas flow from the main conduit at a first location and to return the portion of the gas flow to the conduit at a second location, wherein the sensor passageway has an entrance length ($Le_s$) as a function of the gas and flow rate, and a total length ($L_s$), wherein the sensor passageway is configured to produce an entrance effect ($Leff_s$) in the portion of gas flowing therein that is approximately equal to $Le_s/L_s$; and
a plurality of bypass passageways positioned in the main conduit between the first location and the second location, wherein each of the bypass passageways has an entrance length ($Le_b$) as a function of the gas and flow rate, and a total length ($L_b$), wherein each bypass passageway is configured to produce an entrance effect ($Leff_b$) in gas flowing therewithin ($Le_b/L_b$) that is substantially equal to the entrance effect of the sensor passageway ($Le_s/L_s$) so that the bypass ratio remains substantially the same for any type of gas flowing through the sensor.

2. A sensing apparatus according to claim 1, wherein the bypass passageways are defined by smaller tubes disposed within a larger tube, and the larger tube compresses the smaller tubes against one another.

3. A sensing apparatus according to claim 2, wherein the compressed tubes are not substantially deformed.

4. A sensing apparatus according to claim 1, wherein a total number of the bypass passageways is selected to produce a desired bypass ratio η.

5. A sensing apparatus according to claim 1, wherein one or more of the bypass passageways is replaced by an equal size rod, so as to decrease the gas flow through the main conduit between the first location and the second location.

6. A sensing apparatus according to claim 1, wherein the gas flow in the main conduit from the first location to the second location occurs only through the bypass passageways.

7. A sensing apparatus according to claim 6, wherein one or more spaces between the bypass passageways are blocked, so that flow in the main conduit from the first location to the second location occurs only through the bypass passageways.

8. A sensing apparatus according to claim 1, wherein the respective entrance effect of each bypass passageway and the sensor passageway are relatively small.

9. A sensing apparatus according to claim 1, wherein the plurality of bypass passageways has a substantially uniform packing density.

10. A sensing apparatus according to claim 1, wherein the bypass passageways are bundled in a triangular pattern.

11. A sensing apparatus according to claim 1, wherein each of the bypass passageways is defined by a tube having a length and an inside diameter substantially equal to a length and inside diameter of the sensor passageway.

12. A mass flow controller including a mass flow sensing apparatus according to claim 1, and further including:
a valve connected to the main conduit of the mass flow sensor for controlling mass flow through the main conduit; and
a processor connected to the mass flow sensing apparatus and the valve, wherein the processor is programmed to receive a desire flow rate, compare the desired flow rate to an actual flow rate as measured using the mass flow sensor, and, if actual flow rate does not equal the desired flow rate, reposition the valve so that the actual flow rate equals the desire flow rate.

13. A mass flow rate sensor of claim 1, wherein the mass flow rate sensor measures the flow rate of any type of gas without requiring calibration with a single reference gas.

14. A method of measuring a gas mass flow rate of a gas in a main gas conduit, comprising:
providing a main conduit suitable for containing a mass gas flow;
providing a sensor passageway for tapping a portion of the gas flow from the main conduit at a first location and returning the portion of the gas flow to the conduit at a second location, wherein the sensor passageway has an entrance length ($Le_s$) as a function of the gas and flow rate, and a total length ($L_s$), wherein the sensor passageway is configured to produce an entrance effect ($Leff_s$) in the portion of gas flowing therewithin that is approximately equal to $Le_s/L_s$;
providing a plurality of bypass passageways in the main conduit between the first location and the second location, wherein each of the bypass passageways has an entrance length ($Le_b$) as a function of the gas and flow rate, and a total length ($L_b$), wherein each bypass passageway is configured to produce an entrance effect in gas flowing therewithin ($Leff_b$) that is substantially equal to the entrance effect of the sensor passageway ($Le_s/L_s$) so that the bypass ratio remains substantially the same for any type of gas flowing through the sensor;
supplying electrical current to one or more resistance coils configured around the sensor passageway, wherein heat is added to the gas in the sensor passageway; and
detecting a change in current through the one or more resistance coils, wherein the change in current is a function of the flow of gas within the main conduit.

15. A method according to claim 14, wherein the plurality of bypass passageways is disposed within a larger tube, and the larger tube compresses the bypass passageways against one another.

16. A method according to claim 15, wherein the compressed bypass passageways are not substantially deformed.

17. A method according to claim 14, wherein a total number of the bypass passageways is provided to produce a desired bypass ratio.

18. A method according to claim 14, wherein one or more of the bypass passageways is replaced by an equal size rod.

19. A method according to claim 14, wherein one or more spaces between the bypass passageways are blocked.

20. A method according to claim 14, wherein an entrance effect for the bypass passageways and the sensor passageway are relatively small.

21. A method according to claim 14, wherein the bypass passageways are bundled so that a packing density of the bundled bypass passageways is substantially uniform.

22. A method according to claim 14, wherein the bypass passageways are bundled in a triangular pattern.

23. A method according to claim 14, wherein each of the bypass passageways comprises a tube provided with a length and an inside diameter substantially equal to a length and inside diameter of the sensor passageway.

* * * * *